(12) United States Patent
Rollmann et al.

(10) Patent No.: US 8,301,420 B2
(45) Date of Patent: Oct. 30, 2012

(54) METHOD AND APPARATUS FOR CREATING A REPRESENTATION OF A PRODUCT OR PROCESS

(75) Inventors: Bjarke Rollmann, Clinton Township, MI (US); Jean-Jacques Grimaud, Winchester, MA (US)

(73) Assignee: Dassault Systémes, Velizy-Villácoublay (FR)

( * ) Notice: Subject to any disclaimer, the term of this patent is extended or adjusted under 35 U.S.C. 154(b) by 507 days.

(21) Appl. No.: 12/623,733

(22) Filed: Nov. 23, 2009

(65) Prior Publication Data

US 2011/0125303 A1    May 26, 2011

(51) Int. Cl.
*G06F 17/50* (2006.01)
(52) U.S. Cl. .............................................. 703/1; 705/29
(58) Field of Classification Search .................. 703/1, 6; 707/3, 9; 345/581; 379/201.12; 700/98; 715/752; 705/29; 717/101
See application file for complete search history.

(56) References Cited

U.S. PATENT DOCUMENTS

| | | | |
|---|---|---|---|
| 7,245,310 B2 | 7/2007 | Kawahara et al. | |
| 7,415,152 B2 | 8/2008 | Jiang et al. | |
| 2006/0117012 A1* | 6/2006 | Rizzolo et al. | 707/9 |
| 2007/0013709 A1* | 1/2007 | Charles et al. | 345/581 |
| 2008/0021797 A1* | 1/2008 | Moeller | 705/29 |
| 2008/0172208 A1* | 7/2008 | Lechine | 703/1 |
| 2008/0276184 A1* | 11/2008 | Buffet et al. | 715/752 |
| 2008/0304644 A1* | 12/2008 | Mishra et al. | 379/201.12 |
| 2008/0313596 A1* | 12/2008 | Kreamer et al. | 717/101 |
| 2009/0299979 A1* | 12/2009 | Suh et al. | 707/3 |
| 2009/0326694 A1* | 12/2009 | Stephens et al. | 700/98 |

* cited by examiner

*Primary Examiner* — Kandasamy Thangavelu
(74) *Attorney, Agent, or Firm* — Hamilton, Brook, Smith & Reynolds, P.C.

(57) ABSTRACT

A product lifecycle management system cannot interact with 3D models and data representing a product or process that lacks information for creating a three-dimensional model in a seamless and uniform manner. Such incompatible data includes legacy and conceptual data. Accordingly, a method and corresponding apparatus according to an embodiment of the present invention are provided to create from such data, an intermediary representation that is compatible with the three-dimensional model domain but differs from a three-dimensional model that has real-world geometry of the product or process. The intermediary structure is formed in a manner that enables the product lifecycle management system to interact with the intermediary representation and three-dimensional models in a seamless and uniform manner, and is capable of being updated with real-world geometry of the product or process.

21 Claims, 11 Drawing Sheets

METHOD AND APPARATUS FOR CREATING A REPRESENTATION OF A PRODUCT OR PROCESS

BACKGROUND OF THE INVENTION

Product lifecycle management (PLM) is the process of managing the entire lifecycle of a product from its conception, through design and manufacture, to service and disposal. PLM integrates people, data, processes and business systems and provides a product information backbone for companies and their extended enterprise.

A bill of materials (BOM) includes, for example, lists of raw materials, sub-assemblies, intermediate assemblies, sub-components, components, parts, and quantities of each needed to manufacture an end item. A BOM may be used for communication between manufacturing partners (e.g., main manufacturing-supplier), or confined to a single manufacturing plant. A BOM can, for example, define products as they are designed (e.g., engineering bill of materials), as they are ordered (e.g., sales bill of materials), as they are built (e.g., manufacturing bill of materials), or as they are maintained (service bill of materials). The different types of BOMs depend on the business need and use for which they are intended.

SUMMARY OF THE INVENTION

An example embodiment of the present invention may be implemented in the form of a method or corresponding apparatus for creating a representation of a product or process that enables a product lifecycle management system to interact with the representation and three-dimensional models in a seamless and uniform manner. The method and corresponding apparatus according to one embodiment of the present invention includes: i) given starter data that represents the product or process and lacks information for creating in a three-dimensional model domain, a three-dimensional model of the product or process, creating a root transient geometry from the starter data, ii) identifying at least one part or assembly of parts of the product, or step of the process in the created root transient geometry, iii) creating a leaf transient geometry for each identified part or assembly of parts, or step, iv) associating each created leaf transient geometry with at least one attribute, and v) forming an intermediary structure by organizing the root transient geometry as the root of the structure and each leaf transient geometry with respective associated attribute as a leaf of the structure The formed intermediary structure is a resulting data representation that is compatible with the three-dimensional model domain but differs from a three-dimensional model of the product or process that has real-world geometry of the product or process. The intermediary structure is formed in a manner that enables a product lifecycle management system to interact with the resulting data representation and three-dimensional models in a seamless and uniform manner. Further, the formed intermediary structure is capable of being updated with real-world geometry of the product or process.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION OF THE INVENTION

Figure 1:
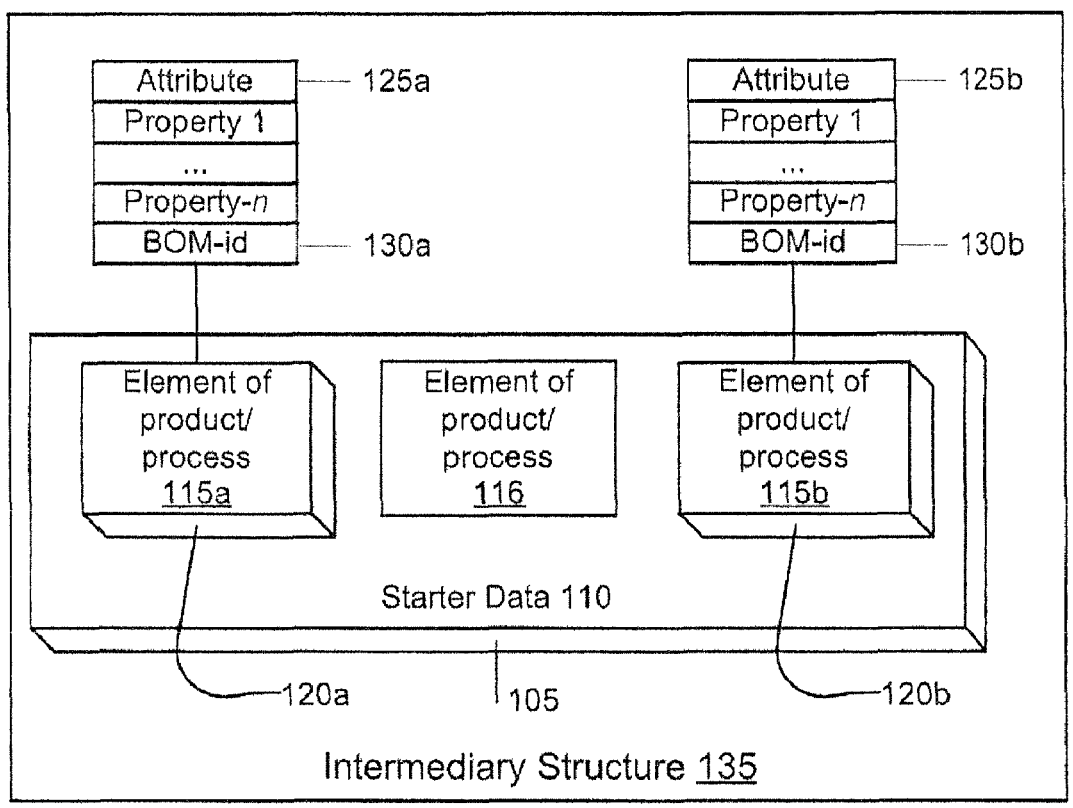
FIG. 1 is a block diagram of an example intermediary representation created in accordance with embodiments of the present invention.

A description of example embodiments of the invention follows.

A product lifecycle management system (and users of the system) cannot interact in a seamless and uniform manner between (i) a three dimensional model that is created in a three-dimensional model domain and (ii) data that lacks information for creating a three-dimensional model in the three-dimensional model domain. Such data includes legacy (or old) data and conceptual (or new) data. The data can represent a product and its elements, such as parts and sub-assembly of parts. The data can also represent a process and its elements, such as steps. The data can represent a combination of a product and process, and their elements. The data can be zero-dimensional (i.e., text), one-dimensional, two-dimensional in nature, or a combination thereof. For reasons that will be readily apparent, this data is referred to hereinafter as "starter data."

There is a need to be able to interact with starter data and the three dimensional model in a seamless and uniform manner. For example, product documentation is now currently made available in interactive three-dimensional versions of work instructions, service procedures, training, sales and marketing tools, etc. This is made possible by accessing a three-dimensional model representing the product to be assembled or serviced, for example. The three-dimensional model is created in a three-dimensional model domain.

In some cases of a legacy product, a three-dimensional model and other such three-dimensional data on (or for) the product is not available. Only drawings, illustrations, images, and other legacy data that lack information for creating a three-dimensional model in a three-dimensional model domain are available. Constructing or reconstructing a three-dimensional model is not practical. It may even be impossible to construct a three-dimensional model of the product when access to the product is not available.

Although some applications may enable the legacy data to be accessed, these applications separately handle legacy data and three-dimensional data, such as the three-dimensional model, so that information represented by the legacy data and the three-dimensional data are presented and manipulated in a non-uniform way. What is needed is a technique for creating a representation of a product or process in the absence of a three-dimensional model of the product or process that enables a product lifecycle management system to interact with the representation and three-dimensional models in a seamless and uniform manner. Further, there is a particular need to create an interactive interface for a legacy product where only legacy data, such as two-dimensional data, is available for the legacy product and to be able to mix three-dimensional data, such as three-dimensional models, and the legacy data in a seamless and uniform way.

Creating such a representation (or interactive interface) enables a product lifecycle management system (or process) to treat the resulting representation in a uniform way, for example, managing attributes, adding meta-properties, and updating their values. This also enables an author/or user of a product lifecycle management system to expose properties and meta-properties whenever relevant, and to create documentation, such as product documentation for a legacy product, that can be automatically updated.

In another example, when a product is conceived, some elements of the product, such as subassemblies of parts, are defined, while others are still in a primordial stage (e.g., as sketches). Given such conceptual data, there is a particular need to start creating an engineering bill of material (eBOM) very early on that can be shared among team members and updated piece by piece (or part by part) as a concept moves to design.

Some or all of these needs may be addressed by embodiments that have a default cube for any missing part and a link to an image of the part or subassembly of parts. The default cube is represented in a tree structure and is associated with properties and meta-properties, the values of which are provided by an engineering bill of material (eBOM) or manufacturing bill of material (mBOM).

A convenient embodiment has a thin three-dimensional rectangle with the image of a subassembly of parts textured on it. Clicking on the subassembly reveals the properties and meta-properties of that subassembly of parts. Additional transparent three-dimensional thin rectangles are positioned in front of the subassembly of parts for each part of interest. Clicking on the image of the part seen through the transparent three-dimensional thin rectangle reveals the properties and meta-properties of the part below the rectangle, in the subassembly.

In general, the embodiments create, from starter data, an intermediary representation of a product or process in the absence of a three-dimensional model of the product or process. The created representation enables a product lifecycle management system (or a user of the product lifecycle management system) to interact with the representation and three-dimensional models in a seamless and uniform manner. Further, the created representation is capable of being updated with real world geometry of the product or process. It is important to recognize that the representation created by these embodiments is not necessarily a three-dimensional model. Moreover, the disclosed embodiments contemplate more than creating a three-dimensional model from starter data.

The foregoing embodiments and those disclosed in further detail below are distinguished from other techniques that separate data, such as two-dimensional data or information, from three-dimensional data or information. These distinguishable techniques may use links, but they do not, for example, work with a tree structure representation of a product or process.

In contrast to these distinguishable techniques, some of the disclosed embodiments upgrade data, such as two-dimensional data, to a representation, which in these embodiments, for the sake of convenience may be referred to as a three-dimensional object. The representation or three-dimensional object is capable of being updated with real-world geometry of a product or process. As such, the resulting representation or three-dimensional object is not necessarily a three-dimensional model, such as one created in a three-dimensional model domain.

These embodiments integrate the resulting representation or three-dimensional object within a tree structure, thus enabling changes to the properties and meta-properties of an mBOM, for example, to be properly associated with the newly created representation or three-dimensional object. For example, multiple changes of a type of fasteners used during assembly of a product may be done without necessarily affecting the representation of the data being upgraded. The names of instances that use the new fastener will be updated, but in some embodiments the image will remained unchanged.

The embodiments are now disclosed in further detail in reference to the figures.

In FIG. 1, an embodiment creates a root transient geometry 105 from starter data 110. The starter data 110 represents a product or process. The starter data 110 lacks information for creating in a three-dimensional model domain, a three-dimensional model of the product or process. In a convenient embodiment, the starter data 110 is two-dimensional data that represents the product or process.

The embodiment identifies at least one element of the product or process 115a and 115b, such as one part or assembly of parts of the product, or step of the process, in the created root transient geometry 105. Another element of the product or process 116 is not identified. Another embodiment identifies as described above in response to, for example, an engineer using a mouse (or cursor control) device to select the at least one element of the product or process 115a and 115b. The selection corresponding to the mouse may be indicated by a pointer (or cursor).

Continuing with FIG. 1, the embodiment creates a leaf transient geometry 120a and 120b for each identified element 115a and 115b. The created root and leaf geometries (105, 120a, and 120b, respectively) are transient in the sense that they begin from starter data, such as a two-dimensional data representation of the product or process, that lacks information for creating a three-dimensional model of the product or process creating in a three-dimensional model domain, and are on their way to becoming complete geometries once they acquire real-world geometry for the product or process.

The embodiment associates each of the created leaf transient geometries 120a and 120b with at least one attribute 125a and 125b. The associated attributes 125a and 125b include, for example, properties and meta-properties, such as Item Number, Part Number, Description, Revision Number, Revision Date, Effectivity, Reference Manufacturing, Drawing Number, Page Number, Sequence Number, Material, Weight, to name a few. A convenient embodiment links each of the leaf transient geometries 120a and 120b to a bill of materials (BOM) or a combination of BOMs. Example BOMs include, bid bill of materials (bidBOM), engineering bill of materials (eBOM), manufacturing bill of materials (mBOM), as-built BOM, as-maintained BOM, as-supported BOM, and service bill of materials (sBOM). One skilled in the art will readily recognize that the inventive principles disclosed herein are not intended to be limit to or by a particular BOM, but contemplate BOMs in general, also referred to as xBOMs. In the example illustrated in FIG. 1, the leaf transient geometries 120a and 120b are linked to a BOM by way of BOM-ID's 130a and 130b.

The embodiment forms an intermediary structure 135 by organizing the root transient geometry 105 as the root of the structure 135 and each of the leaf transient geometries 120a and 120b (together with the associated attributes 125a and 125b) as a leaf of the structure 135. A convenient embodiment organizes the root transient geometry 105 and leaf transient geometries 120a and 120b in a tree structure. In this embodiment, the root transient geometry 105 is the root of the tree structure and the leaf transient geometries 120a and 120b are the leaves (i.e., nodes at ends of branches) of the tree structure.

The formed intermediary structure 135 is a resulting data representation. The term intermediary structure and intermediary representation are used interchangeably herein. The formed intermediary structure 135 is compatible with the three-dimensional model domain with the exception that it differs from a three-dimensional model of the product or process that has real-world geometry of the product or process. The formed intermediary structure 135 enables a product lifecycle management system to interact with the resulting data representation and three-dimensional models in a seamless and uniform manner (described further in reference to FIG. 2). The formed intermediary structure 135 is also capable of being updated or otherwise perfected with real-world geometry of the product or process.

Another convenient embodiment tracks changes or updates to the product or process using the intermediary structure 135 instead of using the two-dimensional data (e.g., the starter data 110) that represents the product or process and that is an authoritative source.

As described earlier, the intermediary representation or structure 135 is not necessarily a three-dimensional model. The intermediary representation 135, however, is capable of being updated with real-world geometry of the product or process. A convenient embodiment acquires real world geometry for the product or process. The embodiment updates the intermediary structure 135 with the acquired real world geometry to produce a complete geometry of the product, e.g., a three-dimensional model or other perfected representation of the product or process.

Consider the following example case. During a concept stage of a life of a vehicle, there is a service bill of materials (sBOM) in which a function, for example, a brake needs to be used with the vehicle. Several brake vendors may have a brake with the proper specifications. During the concept stage, there is also two-dimensional conceptual data that represents the vehicle that contains key specifications (e.g., properties and meta-properties) of the main components of the vehicle. This two-dimensional conceptual data needs to be later updated by the brake vendors that are selected to supply the brake for the vehicle.

In another example case, during a concept stage of a life of a vehicle, the interior of the vehicle has parts that are already identified (e.g., carpet, seat, acoustic ceiling, lights, etc.) and an engineering bill of materials (eBOM) needs to be enriched as the design of the vehicle progresses.

In these two example cases, during the concept stage of the life of a product, such as the vehicle, an embodiment creates a root transient geometry 105 from two-dimensional conceptual data and creates at least one leaf transient geometry 120 from at least one part or assembly of parts identified in the two-dimensional conceptual data, such as the brake. The embodiment links the leaf transient geometries 120 to a bill of materials, such as the sBOM and eBOM through respective BOM-ID's 130. The embodiment forms the intermediary structure 135 in a manner that enables the intermediary structure to be mixed with a three-dimensional model of a previously defined part or assembly of parts, such as the carpet, seat, acoustic ceiling, and lights. The formed intermediary structure 135 is capable of being updated with attributes and geometry as the product evolves from the concept stage to a design stage of the life of the product. For example, the sBOM can be later updated by the brake vendors that are selected to supply the brake for the vehicle and the eBOM can be enriched as the design of the vehicle progresses.

Figure 2:
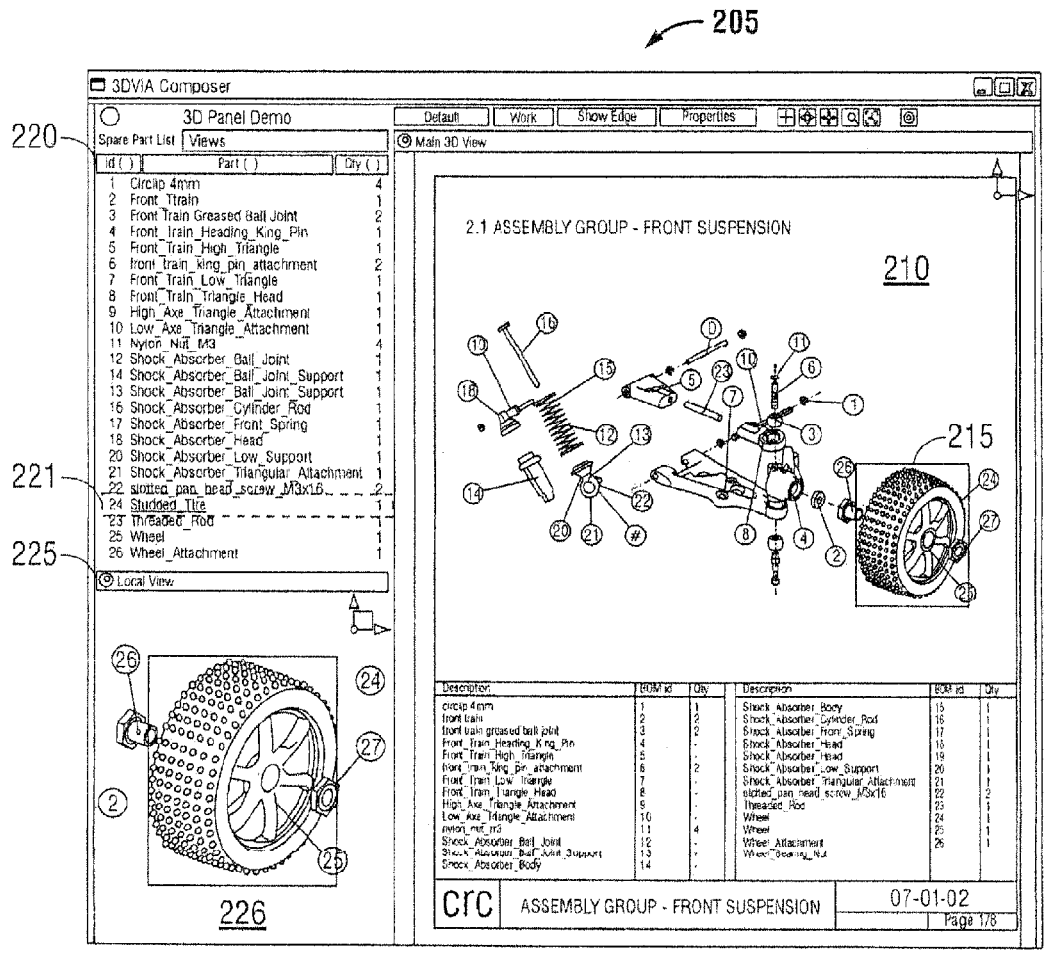
FIGS. 2-4 are screenshots of example embodiments of the present invention.

In FIG. 2, an embodiment creates an intermediary representation 205 as described above. The intermediary representation 205 includes a root transient geometry 210, leaf transient geometry 215, and other leaf transient geometries. In the example illustrated in FIG. 2, the root transient geometry 210 is created from a two-dimensional drawing that represents a front suspension of a vehicle and the leaf transient geometry 215 is created from a studded tire of the front suspension identified in the root transient geometry 210. The other leaf transient geometries are created from other parts of the front suspension identified in the root transient geometry 210.

A user (e.g., a product lifecycle management system engineer) can interact with the created intermediary representation 205 just as he would interact with a three-dimensional model created in a three-dimensional model domain. For example, the user interacts with the intermediary representation 205 by highlighting or otherwise selecting the leaf transient geometry 215 or object in the intermediary representation 205 that represents the studded tire. In a response, the system selects from a parts list 220, a corresponding text label (or description) 221 of the studded tire is selected in response. Additionally, the system responsively selects from a local view 225, a zoomed view 226 of the studded tire.

The user may interact with the parts list 220 and the local view 225 in a similar manner, for example, selecting a text label describing another part, selects an object (or leaf transient geometry) in the intermediary representation 205 that represents that part.

The user interacts with a three-dimensional model in a similar manner. As such, the intermediary representation 205 and a three-dimensional model can be interacted with in a seamless and uniform manner. Moreover, a same viewing delivery system used to deliver a three-dimensional model may also be used to deliver the intermediary representation 205. In contrast, prior to disclosed embodiments, the two-dimensional drawing and a three-dimensional model were delivered by different viewing delivery systems and user interaction was non-uniform between the two systems.

Figure 3:
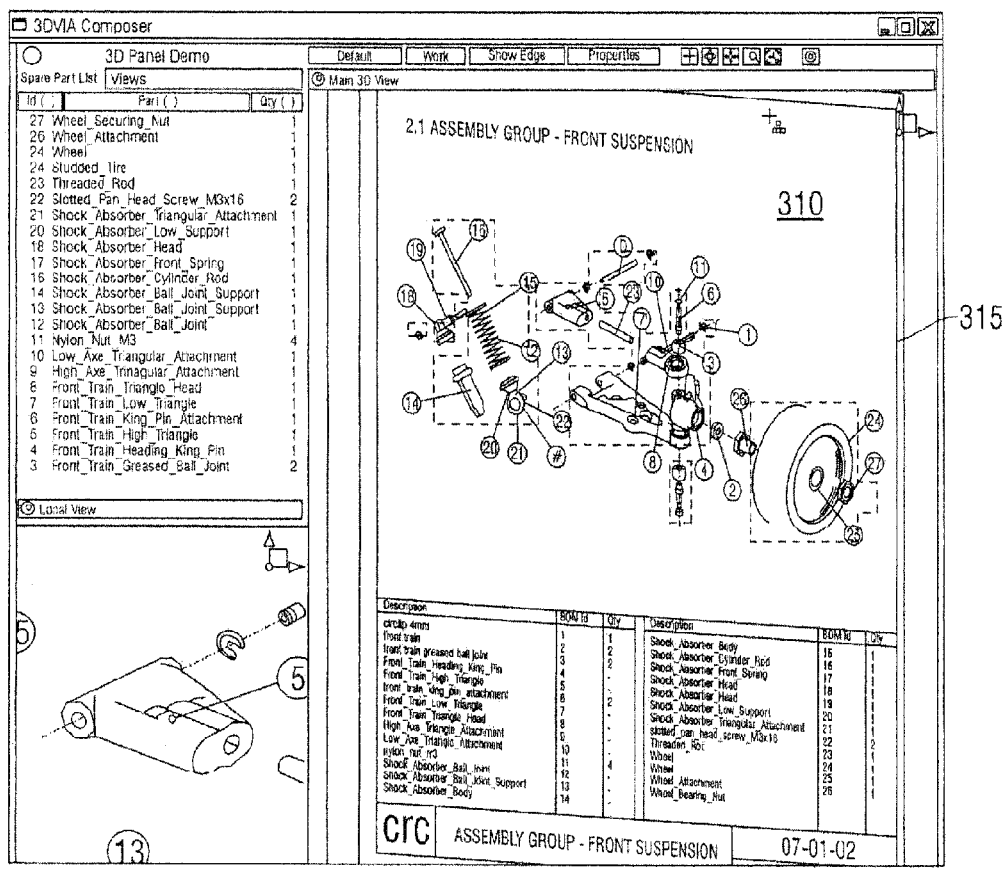

In FIG. 3, a convenient embodiment creates a root transient geometry 305 having the geometry and characteristics of a sheet of plywood. The root transient geometry 305 includes a face 310 and an edge 315. In this embodiment, starter data is applied onto the face 310 as a texture. In a default view of the root transient geometry 305, the face 310 to which the starter data is applied is visible to a user of the present embodiment, while the edge 315 is not. By switching to an edge view of the root transient geometry 305, the face 310 is hidden from the user, while the edge 315 is visible to the user.

Alternatively, the root transient geometry 305 may be rotated such that in resulting views of the root transient geometry 305, some portion of the face 310 and edge 315 is visible to the user, including not visible. For example, 50% of the face 310 and 50% of the edge 315 are visible to the user.

Figure 4:
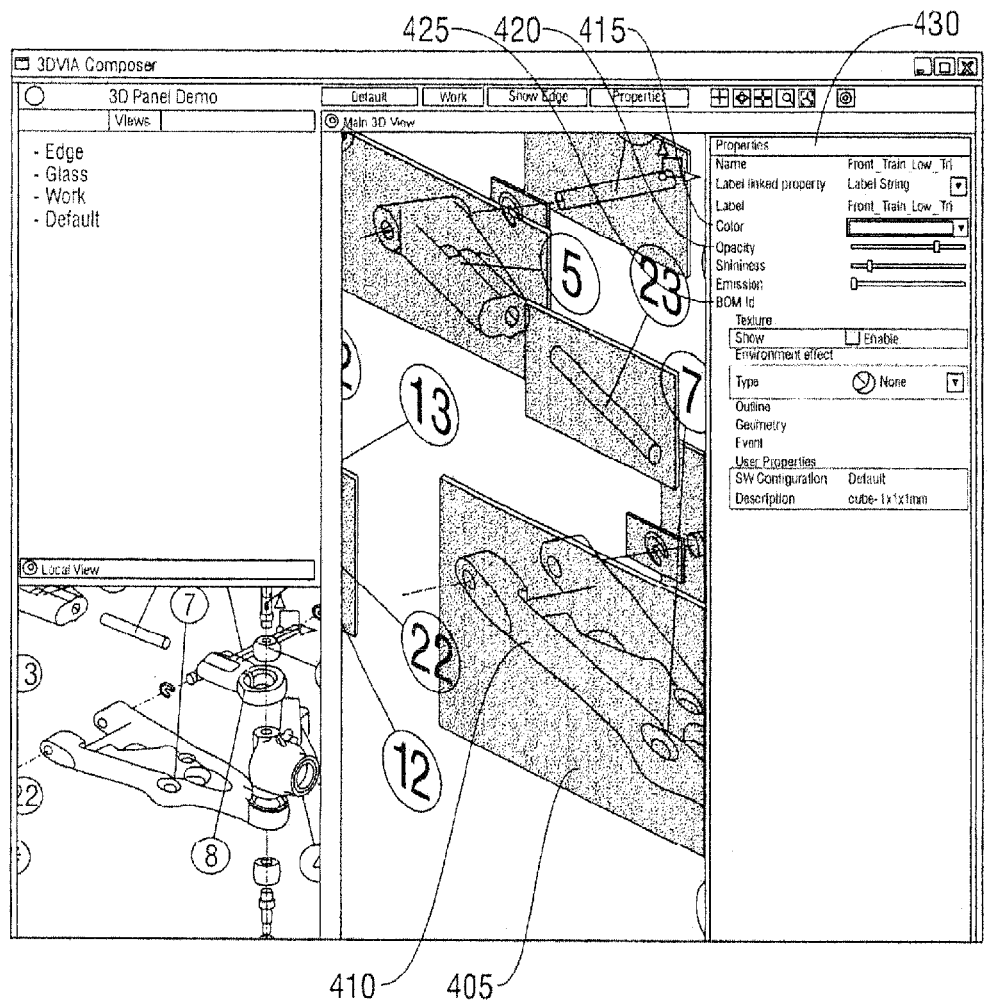

In FIG. 4, a convenient embodiment creates a leaf transient geometry 405 having the geometry and characteristics of a piece of glass. In the example illustrated in FIG. 4, the leaf transient geometry 405 is created for an identified part 410. The leaf transient geometry 405 has a color property 415 and opacity property 420. The color property 415 may be set such that each of the leaf transient geometries forming an intermediary representation (e.g., the intermediary representation 135 of FIG. 1) has a different color that distinguishes the leaf transient geometry 405 from other leaf transient geometries. The color property 415 may be set so as to indicate a priority (e.g., the color red indicates high priority). The opacity property 420 may be set such that the part 410 is visible. The opacity property 420 for a respective leaf transient geometry in the intermediary representation may be different than that of other leaf transient geometries in the intermediary representation.

The color and opacity properties 415 and 420, respectively, may be set by a system operating in accordance with embodiments described herein or by a user of such a system. In this embodiment, it may be convenient to say that the leaf transient geometry 405 contains the color property 415 and opacity properties 420, in addition to a BOM ID 425 and other information 430 related to the part 410, such as properties, texture, environment effect, outline, geometry, event, and user properties.

Figure 5A:
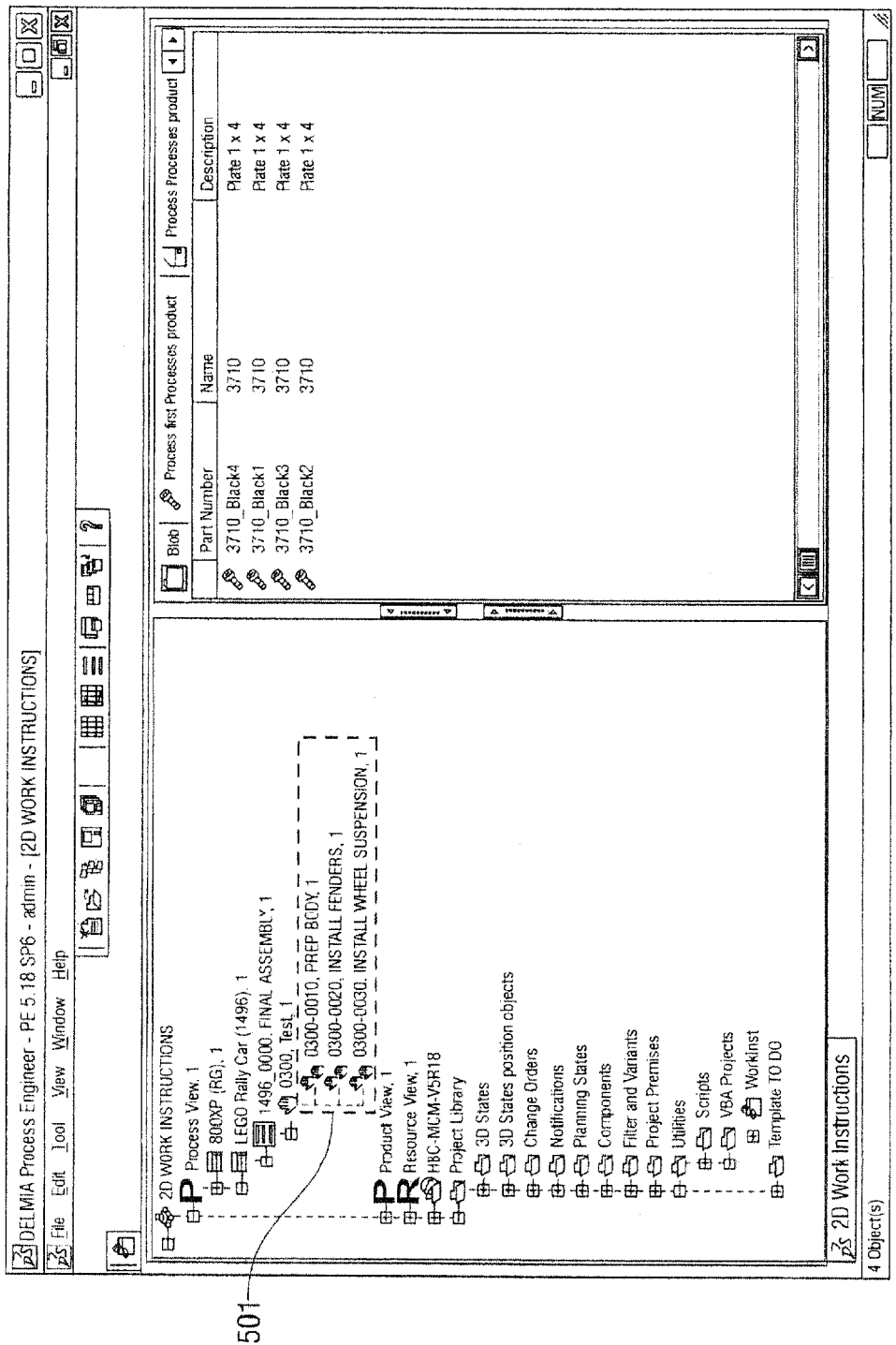
FIGS. 5A-5C is a series of screenshots of another example embodiment of the present invention.
Figure 5B:
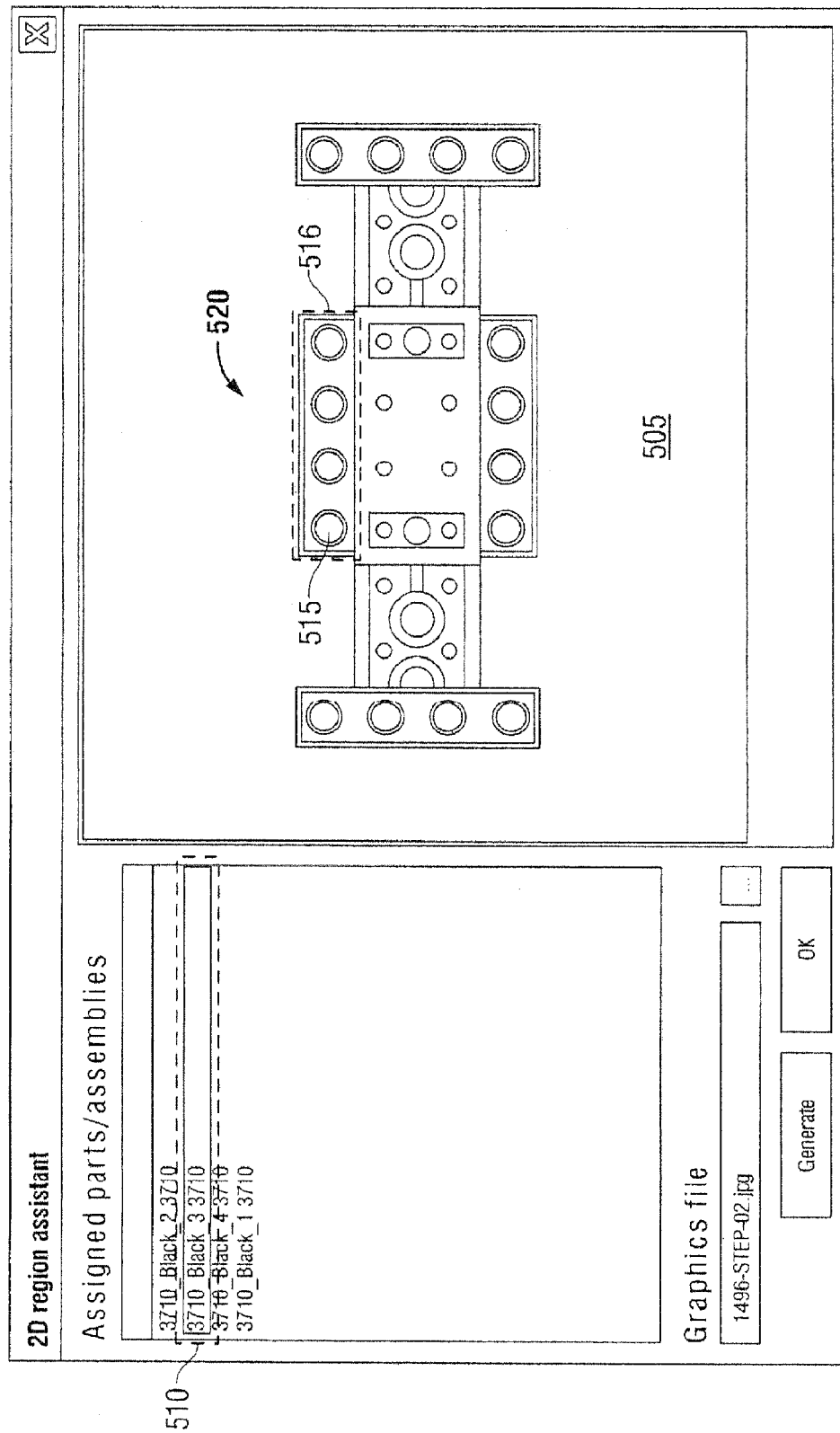
Figure 5C:
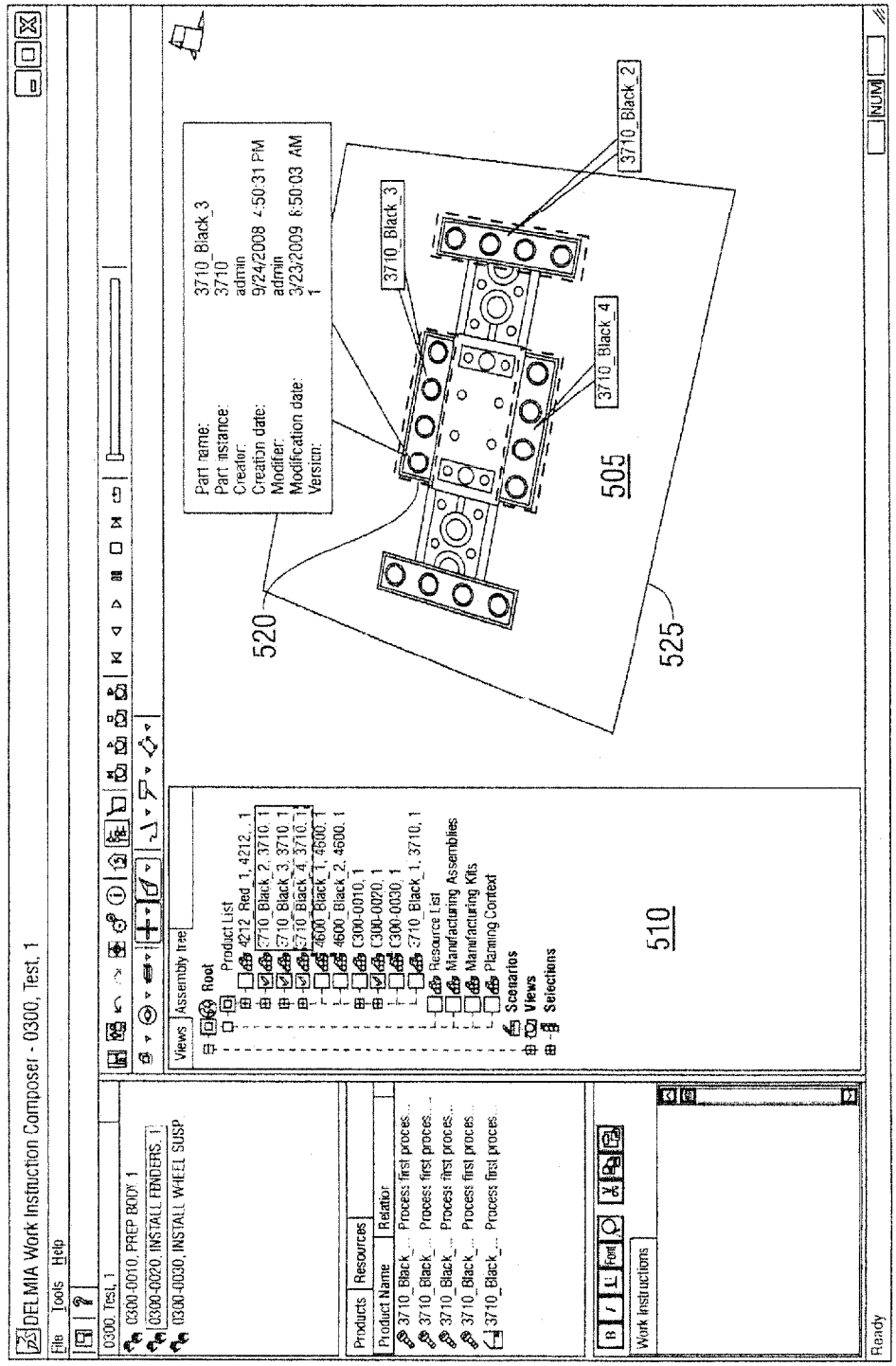

FIGS. 5A-C illustrate another embodiment for creating "two-dimensional hotspots" in three-dimensions. This embodiment incorporates some or all of the inventive principles described herein. In FIG. 5A, the embodiment selects (or in response to a user selecting) a process or assembly 501 for which a two-dimensional image association and three-dimensional region/hotspot shall be created.

In FIG. 5B, the embodiment launches (or in response to the user launching) a "two-dimensional region assistant." The embodiment selects (or in response to a user selecting) a two-dimensional image 505 that represents the assembly 501 and associates it with the corresponding process or assembly. Note how the two-dimensional image 505 lacks information for creating a three-dimensional model of the assembly 501 in a three-dimensional model domain. Further, note how the two-dimensional image 505 is not compatible with the three-dimensional model domain.

The embodiment associates the two-dimensional image 505 that represents or otherwise makes up the assembly 501 to an eBOM or mBOM part 510. The embodiment selects (or in response to a user selecting) each individual part 515 and creates an outline 516 of what will be a region for a hotspot 520.

In FIG. 5C, the embodiment generates (or in response to a user clicking on a generate button) a three-dimensional representation 525 of the two-dimensional image 505 and each hotspot 520. The embodiment makes visible the three-dimensional representation 525 of the two-dimensional image 505 and each hotspot 520.

The resulting three-dimensional representation 525 enables it and three-dimensional models be interacted with in a seamless and uniform manner, for example, as described above in reference to FIG. 2. In the example illustrated in FIG. 5, the three-dimensional representation 525 enables each hotspot 520 to be highlighted from within the eBOM/mBOM 510 just as a part represented in a three-dimensional model that is created in a three-dimensional model domain would be highlighted.

Figure 6:
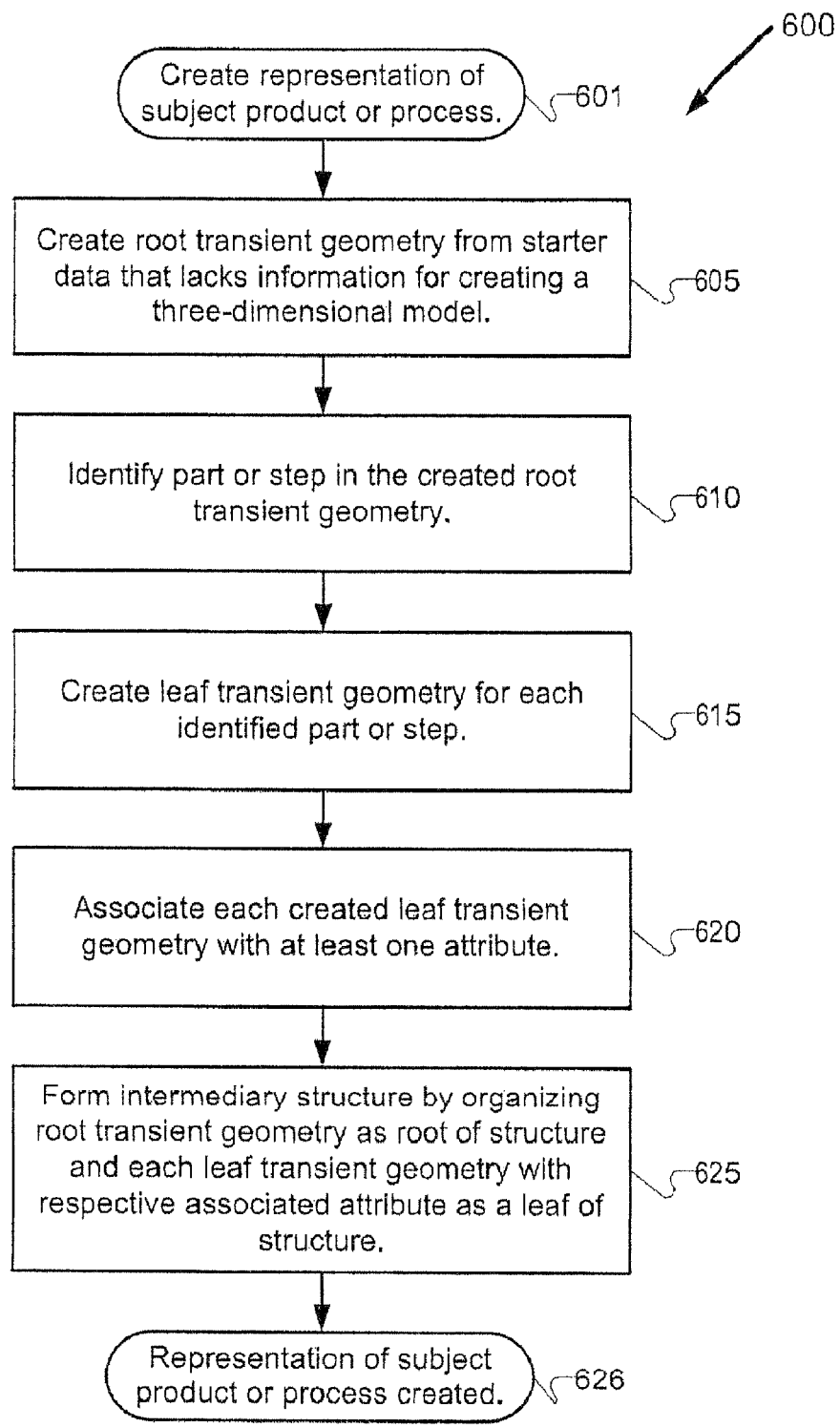
FIG. 6 is a flowchart of an example method for creating a representation of a product or process in accordance with an embodiment of the present invention.

FIG. 6 illustrates an example method, computer routine or the like 600 for creating a representation of a subject product or process that enables a product lifecycle management system to interact with the representation and three-dimensional models in a seamless and uniform manner. The invention method/routine 600 starts (601). The routine 600 given starter data that represents the subject product or process, creates (605) a root transient geometry from the starter data. The starter data lacks information for creating a three-dimensional model of the subject product or process in a three-dimensional model domain.

The routine 600 identifies (610) at least one part or assembly of parts of the subject product, or step of the subject process in the created root transient geometry.

The routine 600 creates (615) a leaf transient geometry for each identified part or assembly of parts, or step.

The routine 600 associates (620) each created leaf transient geometry with at least one attribute.

The routine 600 forms (625) an intermediary structure by organizing the root transient geometry as the root of the structure and each of the leaf transient geometries with respective associated attributes as a leaf of the structure. The formed intermediary structure is a resulting data representation that is compatible with the three-dimensional model domain but differs from a three-dimensional model of the subject product or process that has real-world geometry of the product or process. The resulting data representation is formed in a manner that enables a product lifecycle management system to interact with the resulting data representation and three-dimensional models in a seamless and uniform manner, for example, as described in reference to FIG. 2. Further, the resulting data representation is capable of being updated with real-world geometry of the subject product or process.

The routine 600 ends (626) having created the representation of the subject product or process that enables the product lifecycle management system to interact with the representation and three-dimensional models seamlessly and uniformly.

Figure 7:
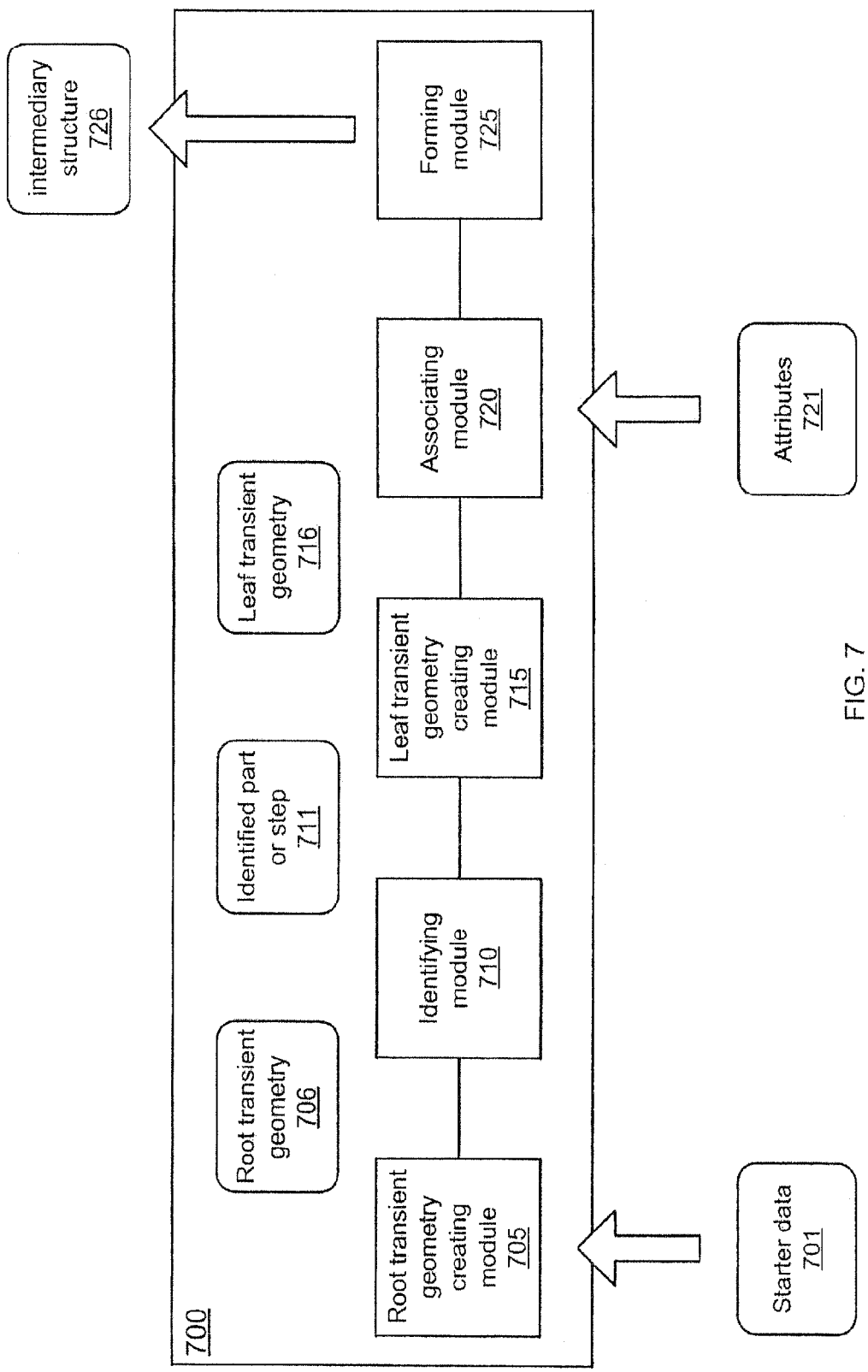
FIG. 7 is a block diagram of an example apparatus to create a representation of a product or process in accordance with an embodiment of the present invention.

FIG. 7 illustrates an example apparatus 700 to create a representation of a subject product or process that enables a product lifecycle management system to interact with the representation and three-dimensional models in a seamless and uniform manner. The apparatus 700 includes a root transient geometry creating module 705, identifying module 710, leaf transient geometry creating module 715, associating module 720, and forming module 725, each of which are communicatively coupled from one to another.

The root transient geometry creating module 705 creates a root transient geometry 706 from input starter data 701 that represents the subject product or process. The starter data 701 lacks information for creating a three-dimensional model of the subject product or process in a three-dimensional model domain.

The identifying module 710 identifies at least one part or assembly of parts of the subject product, or step of the subject process 711 in the created root transient geometry 706.

The leaf transient geometry creating module 715 creates a leaf transient geometry 716 for each identified part or assembly of parts, or step 711.

The associating module 720 associates each leaf created transient geometry 716 with at least one attribute 721.

The forming module 725 forms an intermediary structure 726 by organizing the root transient geometry 706 as the root of the structure and each of the leaf transient geometries 716 with respective associated attributes 721 as a leaf of the structure. The intermediary structure 726 that is formed is a resulting data representation that is compatible with the three-dimensional model domain but differs from a three-dimensional model of the product or process that has real-world geometry of the product. The intermediary structure 726 is formed in a manner that enables a product lifecycle management system to interact with the resulting data representation and three-dimensional models in a seamless and uniform manner. Additionally, the intermediary structure 726 is capable of being updated with real-world geometry of the product or process.

Alternatively, the example apparatus 700 may be a general purpose computer having a processor, memory, communication interface, etc. The general purpose computer is transformed into the apparatus 700, a particular machine, and its components, for example, by loading instructions into the processor that cause the computer to create a root transient geometry from starter data, identify at least one part or assembly of parts of the product, or step of the process in the created root transient geometry, creating a leaf transient geometry for each identified part or assembly of parts, or step, associate each created leaf transient geometry with at least one attribute, and form an intermediary structure by organizing the root transient geometry as the root of the structure and each leaf transient geometry with respective associated attributes as a leaf of the structure.

Figure 8A:
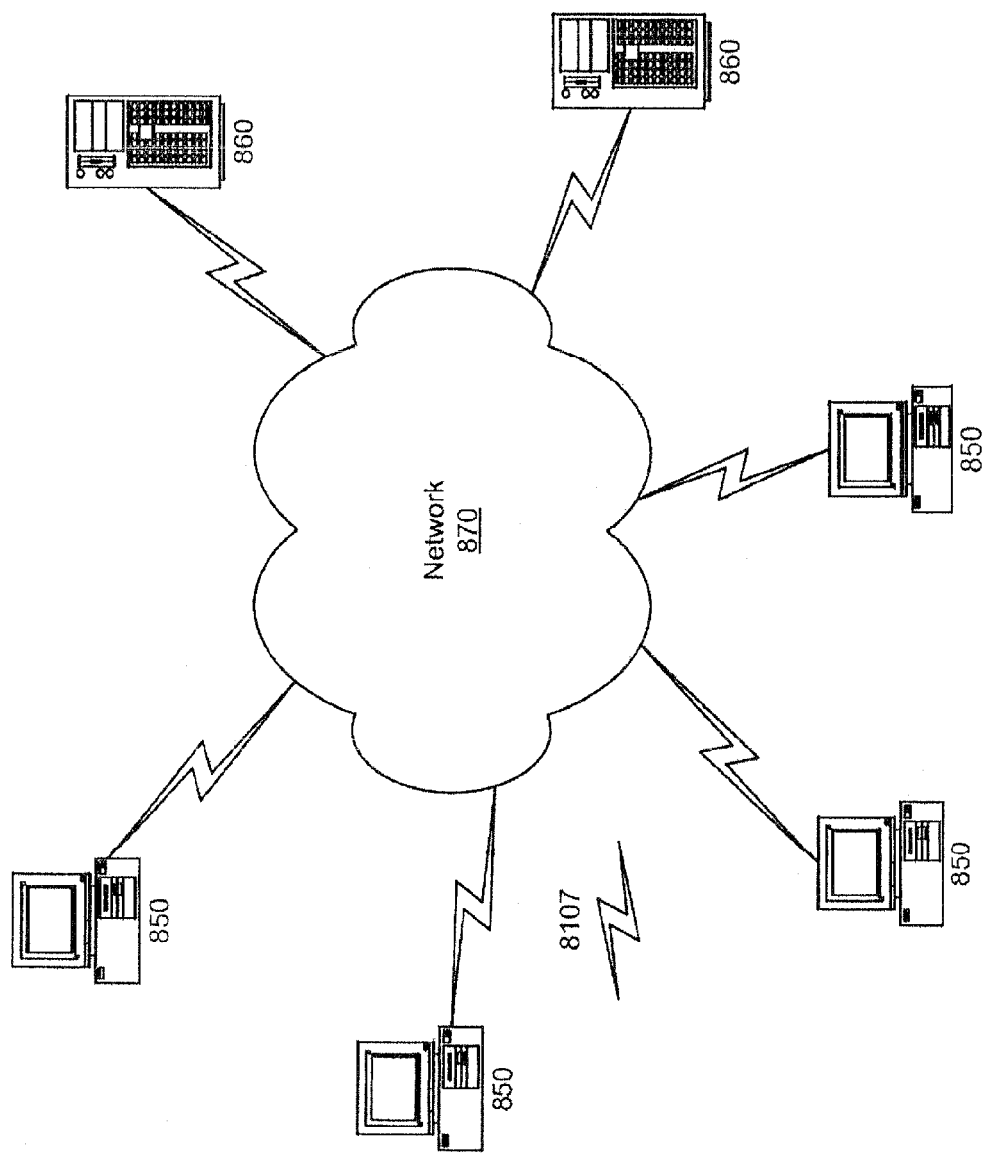
FIG. 8A is an example computer network deploying embodiments of the present invention.

FIG. 8A illustrates a computer network or similar digital processing environment in which embodiments of the present invention may be deployed. Client computer(s)/devices 850 and server computer(s) 860 provide processing, storage, and input/output devices executing application programs and the like. Client computer(s)/devices 850 can also be linked through communications network 870 to other computing devices, including other client devices/processes 860 and server computer(s) 850. Communications network 870 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8B:
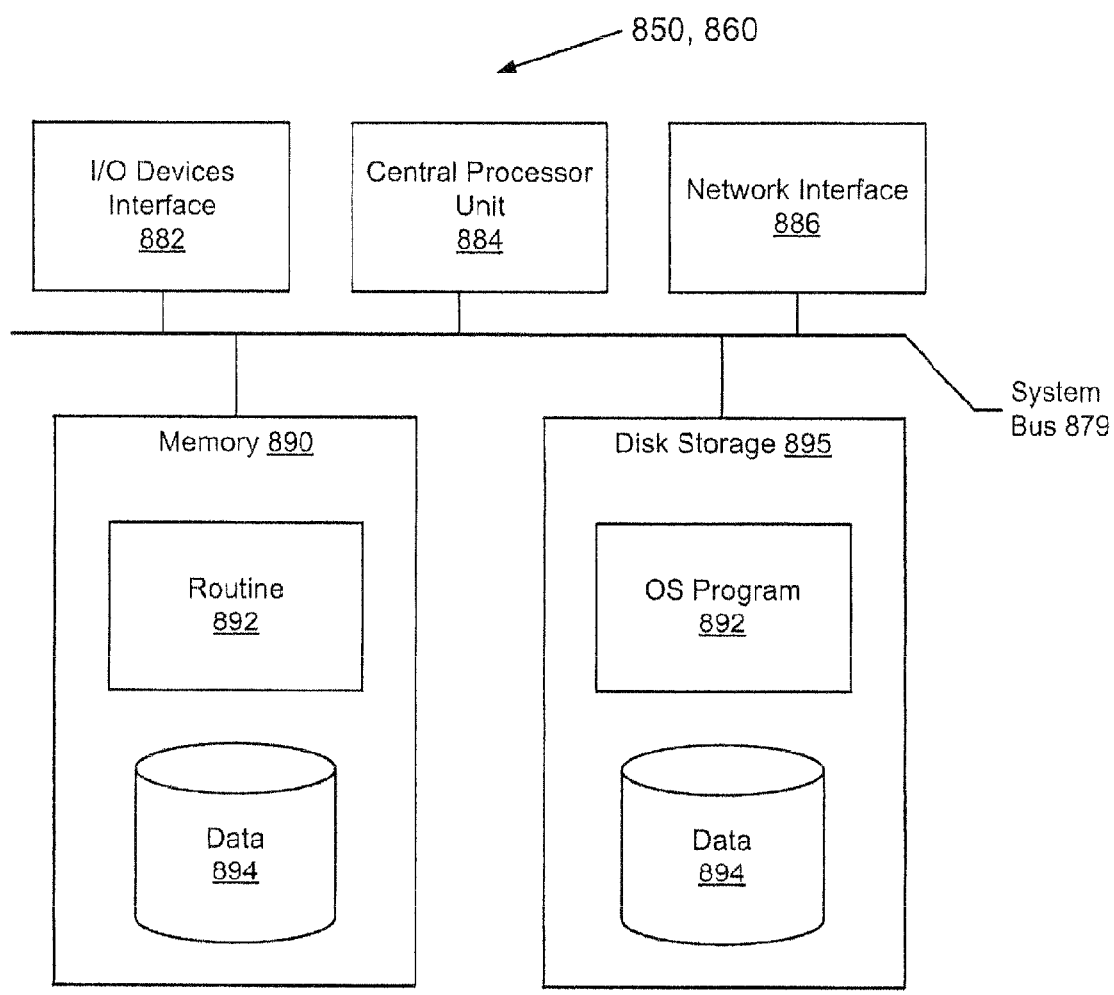
FIG. 8B is an example computer implementing embodiments of the present invention.

FIG. 8B is a block diagram of the internal structure of a computer (e.g., client processor/device 850 or server computers 860 of FIG. 8A) in which various embodiments of the present invention may be implemented, such as the example method/computer routine 600 of FIG. 6 and the example apparatus 700 of FIG. 7. Each computer 850,860 contains system bus 879, where a bus is a set of hardware lines used for data transfer among the components of a computer or processing system. Bus 879 is essentially a shared conduit that connects different elements of a computer system (e.g., processor, disk storage, memory, input/output ports, network ports, etc.) that enables the transfer of information between the elements. Attached to system bus 879 is I/O device interface 882 for connecting various input and output devices (e.g., keyboard, mouse, displays, printers, speakers, etc.) to the computer 850, 860. Network interface 886 allows the computer to connect to various other devices attached to a network (e.g., network 870 of FIG. 8A). Memory 890 provides volatile storage for computer software instructions 892 and data 894 used to implement an embodiment of the present invention. Disk storage 895 provides non-volatile storage for computer software instructions 892 and data 894 used to implement an embodiment of the present invention. Central processor unit 884 is also attached to system bus 879 and provides for the execution of computer instructions.

In one embodiment, the processor routines 892 and data 894 are a computer program product (generally referenced 892), including a computer readable medium (e.g., a removable storage medium such as one or more DVD-ROM's, CD-ROM's, diskettes, tapes, etc.) that provides at least a portion of the software instructions for the invention system. Computer program product 892 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 8107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 892.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 892 is a propagation medium that the computer system 860 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented in a variety of computer architectures. The computer of FIGS. 8A and 8B are for purposes of illustration and not limitation of the present invention.

It should be understood that the block diagrams and flow charts may include more or fewer elements, be arranged differently, or be represented differently. It should be understood that implementation may dictate the block/flow/network diagrams and the number of block/flow/network diagrams illustrating the execution of embodiments of the invention.

It should be understood that elements of the block diagrams and flow charts described above may be implemented in software, hardware, or firmware. In addition, the elements of the block/flow/network diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented transformation method for creating a representation of a product or process that enables a product lifecycle management system to interact with the representation and three-dimensional models in a seamless and uniform manner, the representation is created in the absence of a three-dimensional model of the product or process, the method comprising:

given starter data that represents the product or process and that lacks information for creating in a three-dimensional model domain, a three-dimensional model of the product or process, creating, using a computer, a root transient geometry from the starter data;

identifying at least one part or assembly of parts of the product, or step of the process in the created root transient geometry;

creating, using the computer, a leaf transient geometry for each identified part or assembly of parts, or step;

associating each created leaf transient geometry with at least one attribute; and forming, using the computer, an intermediary structure by organizing the root transient geometry as the root of the structure and each leaf transient geometry with respective associated attribute as a leaf of the structure, the intermediary structure being a resulting data representation that is compatible with the three-dimensional model domain but differs from a three-dimensional model of the product or process that has real-world geometry of the product or process, the intermediary structure being formed in a manner that enables a product lifecycle management system to interact with the resulting data representation and three-dimensional models in a seamless and uniform manner, and is capable of being updated with real-world geometry of the product or process.

2. The computer-implemented transformation method of claim 1 wherein creating the root transient geometry includes creating the root transient geometry from two-dimensional data that represents the product or process.

3. The computer-implemented transformation method of claim 1 wherein creating the root transient geometry includes creating the root transient geometry from text that represents the product or process.

4. The computer-implemented transformation method of claim 1 wherein creating the root transient geometry includes creating the root transient geometry with the geometry and characteristics of a sheet of plywood.

5. The computer-implemented transformation method of claim 1 wherein creating the leaf transient geometry includes creating the leaf transient geometry with the geometry and characteristics of a sheet of glass.

6. The computer-implemented transformation method of claim 1 wherein associating includes linking the at least one leaf transient geometry to a bill of materials (BOM).

7. The computer-implemented transformation method of claim 1 wherein organizing includes organizing the root transient geometry and leaf transient geometries in a tree structure.

8. The computer-implemented transformation method of claim 1 further comprising tracking changes to the product using the intermediary structure instead of using the starter data that represents the product or process and is an authoritative source.

9. The computer-implemented transformation method of claim 1 further comprising:
  acquiring real world geometry for the product or process; and
  updating the intermediary structure with the acquired real world geometry to produce a complete geometry of the product or process.

10. The computer-implemented transformation method of claim 1,
  further comprising a concept stage of a life of the product being managed by the product lifecycle management system; and
  wherein the starter data is two-dimensional conceptual data that represents the product;
  wherein creating the root and the at least one leaf transient geometries includes creating the root and the at least one leaf transient geometries from the two-dimensional conceptual data and at least one part or assembly of parts being identified in the two-dimensional conceptual data, respectively;
  wherein associating includes linking the at least one leaf transient geometry to a bill of materials; and
  wherein forming the intermediary structure includes forming the intermediary structure in a manner that enables the intermediary structure to be mixed with a three-dimensional model of a previously defined part or assembly of parts, and is capable of being updated with attributes and geometry as the product evolves from the concept stage to a design stage of the life of the product.

11. An apparatus to create a representation of a product or process that enables a product lifecycle management system to interact with the representation and three-dimensional models in a seamless and uniform manner, the apparatus creates the representation in the absence of a three-dimensional model of the product or process, the apparatus comprising:
  a processor;
  a memory storing a program of instructions for:
  a root transient geometry creating module to create a root transient geometry from starter data that represents the product or process and that lacks information for creating in a three-dimensional model domain, a three-dimensional model of the product or process;
  an identifying module communicatively coupled to the root transient geometry creating module to identify at least one part or assembly of parts of the product, or step of the process in the created root transient geometry;
  a leaf transient geometry creating module communicatively coupled to the identifying module to create a leaf transient geometry for each identified part or assembly of parts, or step;
  an associating module communicatively coupled to the leaf transient geometry creating module to associate each created leaf transient geometry with at least one attribute; and
  a forming module communicatively coupled to the associating module to form an intermediary structure by organizing the root transient geometry as the root of the structure and each leaf transient geometry with respective associated attribute as a leaf of the structure, the intermediary structure being a resulting data representation that is compatible with the three-dimensional model domain but differs from a three-dimensional model of the product or process that has real-world geometry of the product or process, the intermediary structure being formed in a manner that enables a product lifecycle management system to interact with the resulting data representation and three-dimensional models in a seamless and uniform manner, and is capable of being updated with real-world geometry of the product or process.

12. The apparatus of claim 11 wherein the root transient geometry creating module creates the root transient geometry from two-dimensional data that represents the product or process.

13. The apparatus of claim 11 wherein the root transient geometry creating module creates the root transient geometry from text that represents the product or process.

14. The apparatus of claim 11 wherein the root transient geometry creating module creates the root transient geometry with the geometry and characteristics of a sheet of plywood.

15. The apparatus of claim 11 wherein the root transient geometry creating module creates the leaf transient geometry with the geometry and characteristics of a sheet of glass.

16. The apparatus of claim 11 wherein the associating module links the at least one leaf transient geometry to a bill of materials (BOM).

17. The apparatus of claim 11 wherein the forming module organizes the root transient geometry and leaf transient geometries in a tree structure.

18. The apparatus of claim 11 further comprising a tracking module communicatively to track changes to the product using the intermediary structure instead of using the starter data that represents the product or process and is an authoritative source.

19. The apparatus of claim 11 further comprising:
an acquiring module to acquire real world geometry for the product or process; and
an updating module communicatively coupled to the acquiring module to updating the intermediary structure with the acquired real world geometry to produce a complete geometry of the product or process.

20. The apparatus of claim 11,
the memory further comprising instructions for a concept stage of a life of the product being managed by the product lifecycle management system; and
wherein the starter data is two-dimensional conceptual data that represents the product;
wherein the root and leaf transient geometry creating modules create the root and the at least one leaf transient geometries from the two-dimensional conceptual data and at least one part or assembly of parts being identified in the two-dimensional conceptual data, respectively;
wherein the associating module links the at least one leaf transient geometry to a bill of materials; and
wherein the forming module forms the intermediary structure in a manner that enables the intermediary structure to be mixed with a three-dimensional model of a previously defined part or assembly of parts, and is capable of being updated with attributes and geometry as the product evolves from the concept stage to a design stage of the life of the product.

21. A computer program product comprising a non-transitory computer readable medium having a computer readable program, wherein the computer readable program when executed on a computer causes the computer to:
given starter data that represents the product or process and that lacks information for creating in a three-dimensional model domain, a three-dimensional model of the product or process, create a root transient geometry from the starter data;
identify at least one part or assembly of parts of the product, or step of the process in the created root transient geometry;
create a leaf transient geometry for each identified part or assembly of parts, or step;
associate each created leaf transient geometry with at least one attribute; and
form an intermediary structure by organizing the root transient geometry as the root of the structure and each leaf transient geometry with respective associated attribute as a leaf of the structure, the intermediary structure being a resulting data representation that is compatible with the three-dimensional model domain but differs from a three-dimensional model of the product or process that has real-world geometry of the product or process, the intermediary structure being formed in a manner that enables a product lifecycle management system to interact with the resulting data representation and three-dimensional models in a seamless and uniform manner, and is capable of being updated with real-world geometry of the product or process.

* * * * *